Jan. 11, 1955     L. R. BUCKENDALE     2,699,075
VEHICLE DRIVE MECHANISM
Filed Aug. 16, 1951     4 Sheets-Sheet 1
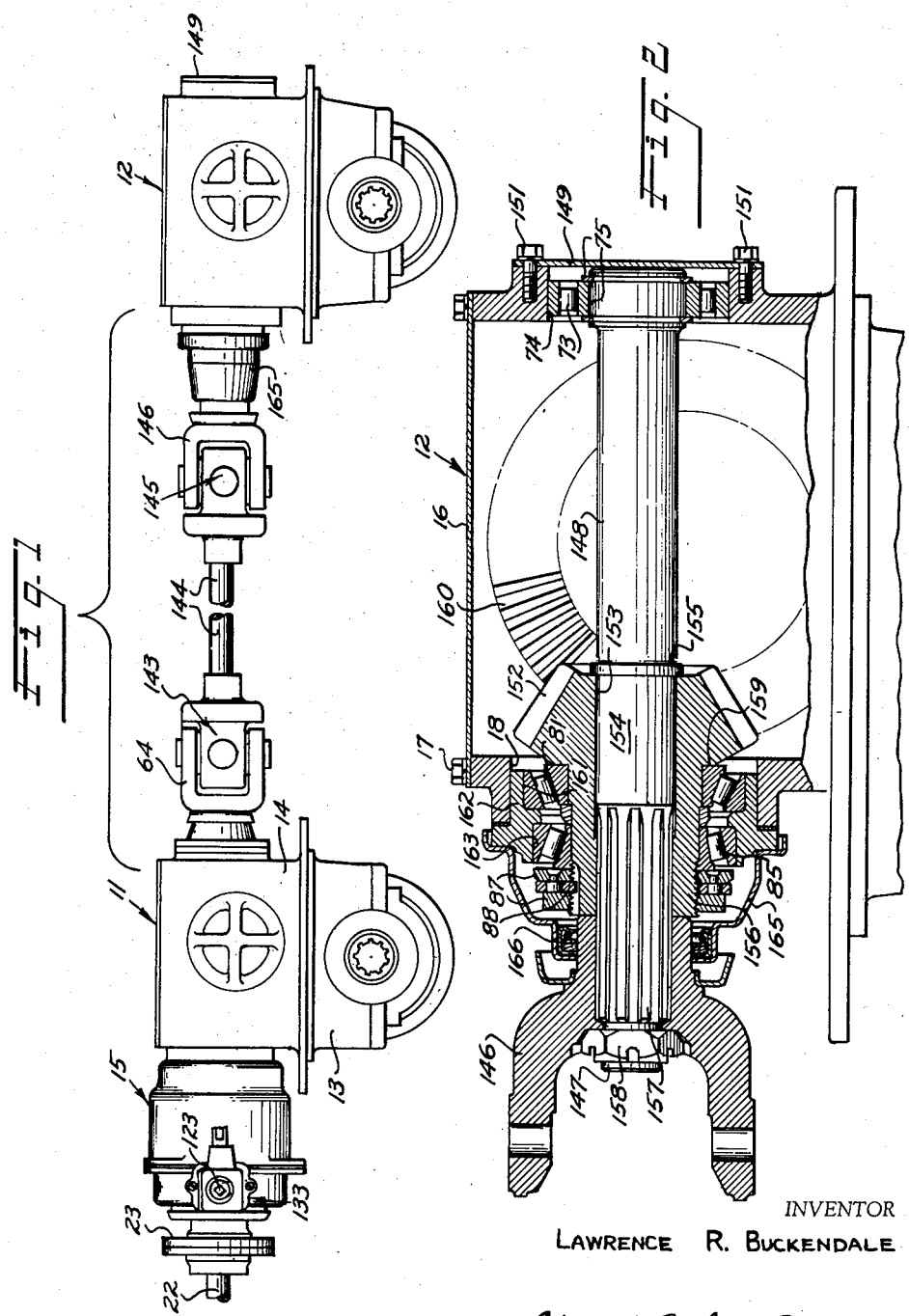
INVENTOR
LAWRENCE R. BUCKENDALE
BY *Strauch, Nolan & Diggins*
ATTORNEYS INVENTOR
LAWRENCE R. BUCKENDALE
BY Strauch, Nolan & Diggins
ATTORNEYS INVENTOR
LAWRENCE R. BUCKENDALE
BY Strauch, Nolan + Diggins
ATTORNEYS

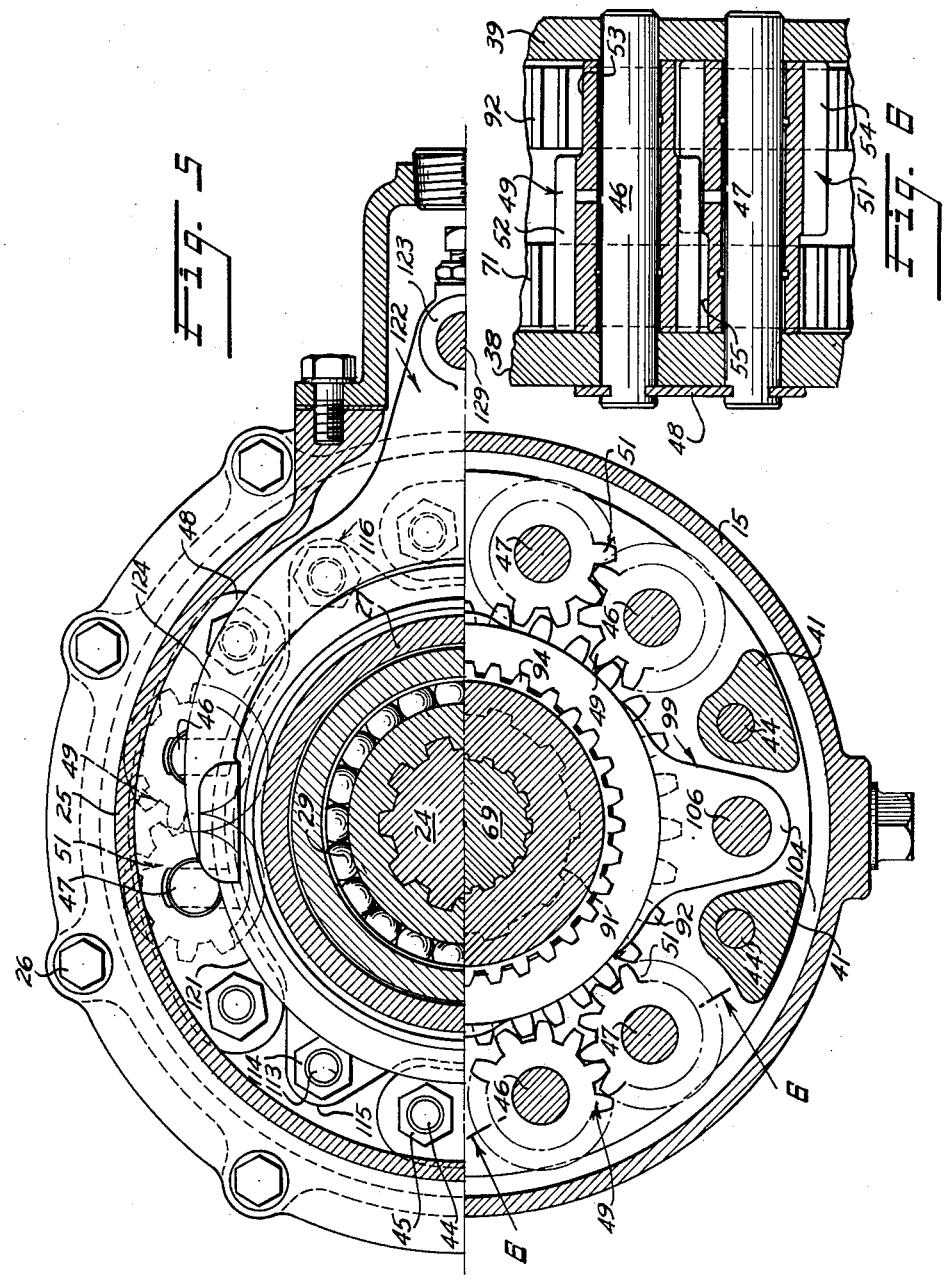

United States Patent Office 2,699,075
Patented Jan. 11, 1955

2,699,075

VEHICLE DRIVE MECHANISM

Lawrence R. Buckendale, Detroit, Mich., assignor, by mesne assignments, to Rockwell Spring and Axle Company, Coraopolis, Pa., a corporation of Pennsylvania Application August 16, 1951, Serial No. 242,090

8 Claims. (Cl. 74—710)

This invention relates to the propulsion of motor vehicles, and particularly pertains to a mechanism for driving a plurality of pairs of vehicle wheels through the medium of a plurality of differentials, and more especially relates to tandem axle drives such as are employed on trucks, busses and similar heavy duty motor vehicles.

For travel over firm terrain such as surfaced roads and highways and where traction is good it is highly desirable to divide the torque between tandem drive axles equally, but under conditions of poor traction such as slippery snow covered or icy roads or off the highway travel over soft ground or through sand or mud, this division of torque may allow all the driving force to both rear axles to be dissipated through a spinning wheel. Under such conditions it is very desirable to provide torque only to the drive axle where traction is present.

It is, accordingly, a primary object of this invention to provide in multi-drive wheel vehicles novel mechanisms enabling the axles to be differentially driven under normal conditions and positively driven under adverse traction conditions.

Another object of the invention is to provide a novel interaxle differential driving mechanism associated with one of the differential driving axles for driving both axles either together or differentially.

A further object of the invention is to provide a differential drive of the above character which is highly efficient, durable, of simple construction, and which embodies means whereby full compensation of any two pairs of driven wheels, or any one wheel, or any combination of wheels of a multiple pair drive may be effected from a single source of power and which embodies a construction whereby a driving load may be equally divided and uniformly applied to both driving axles.

These and other objects will become more apparent as the following disclosure proceeds in conjunction with the attached drawings which form part of the specification and wherein like numerals refer to like parts wherever they occur.

Figure 1 is a partially diagrammatic view in side elevation of a tandem axle assembly according to a preferred embodiment of the invention.

Figure 2 is an enlarged elevation partly in section showing structure in the rearmost axle of Figure 1.

Figure 5 is a section on line 5—5 of Figure 4 illustrating further the novel interaxle differential.

Figure 6 is a fragmentary section on line 6—6 of Figure 5 illustrating the meshed spur gear and pinion arrangement in the interaxle differential.

The invention will be described in its preferred embodiment as being incorporated into a top mounted hypoid double reduction tandem axle assembly for reasons of permitting a longer propeller shaft and smaller universal joint angles, but is not so limited in application, being equally adaptable to tandem axles employing other types of drive axles.

The interaxle differential with lockout of the invention is preferably provided as an accessory to a standard axle, and may be easily installed or removed, but it may be built in as a permanent part of a tandem axle assembly.

Figure 1 illustrates a tandem axle assembly comprising a forward axle unit 11 and a rearward axle unit 12. This is the usual tandem axle arrangement beneath the rear of a heavy duty vehicle and both axle units 11 and 12 are drive axles supported at opposite ends by the usual ground engaging wheels (not shown).

Each illustrated drive axle is a top mounted, hypoid, double reduction axle unit and, apart from the removably attached differential on the forward axle 11, they are substantially of identical structure.

Figure 3:
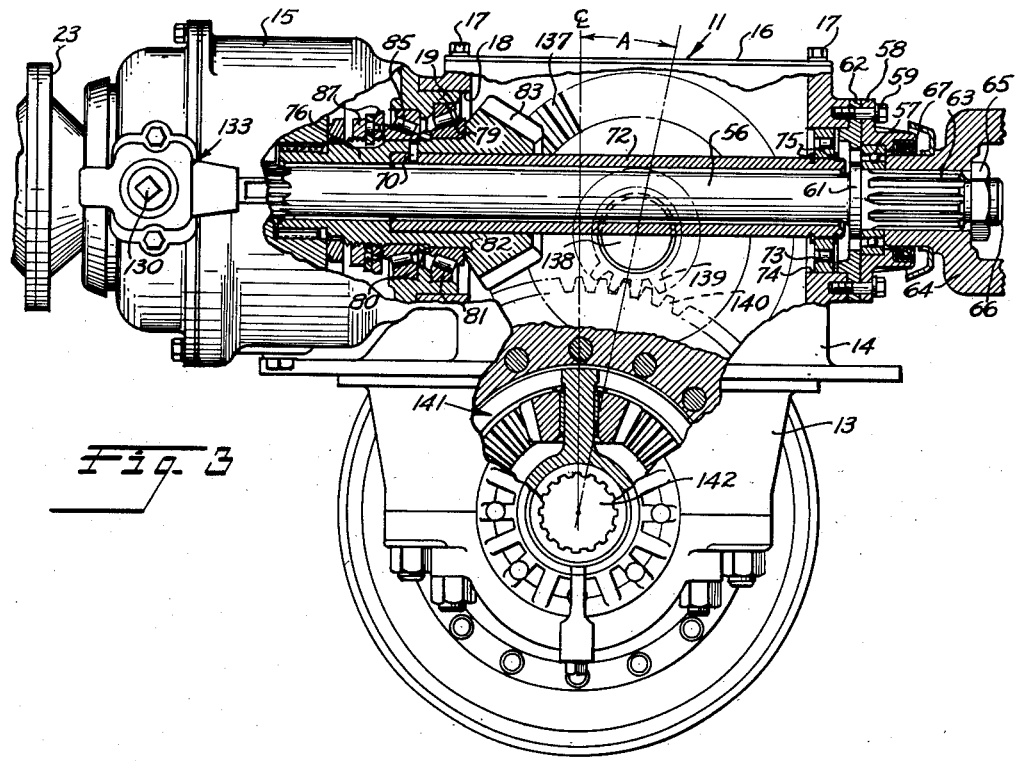
Figure 3 is an enlarged side elevation partially in section of the forward axle of Figure 1 showing the associated differential.

Referring to Figure 3 the forward axle unit comprises a main housing 13 which contains the axle differential, an upper auxiliary housing 14 bolted to housing 13 and which contains the first reduction gearing, and an interaxle differential housing 15. The upper end of housing 14 is closed by a cover plate 16 secured in place by machine screws 17.

Figure 7:
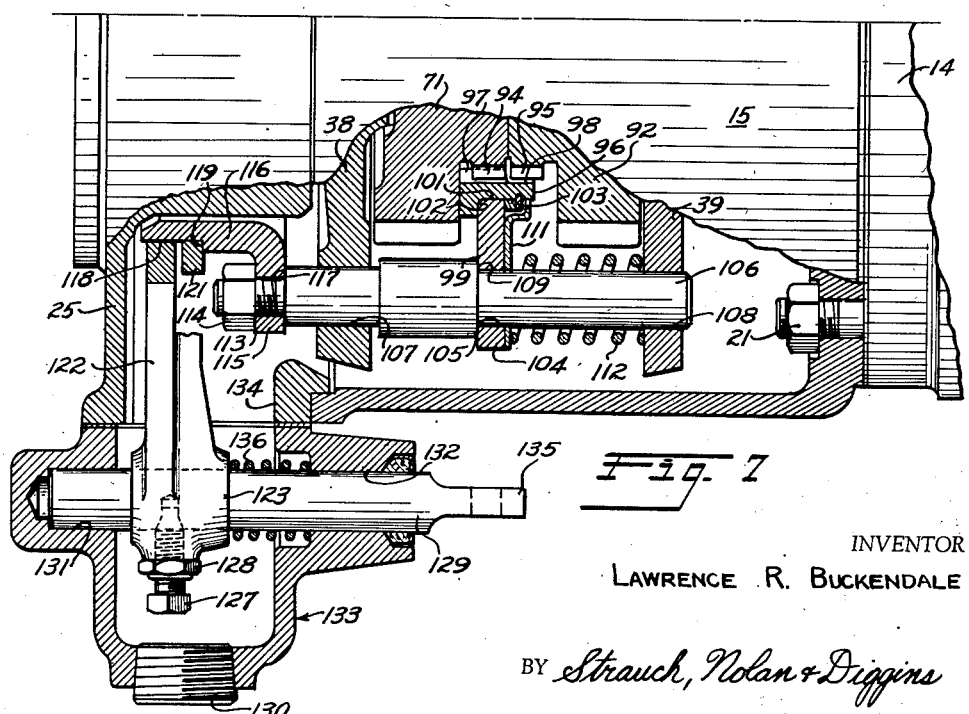
Figure 7 is a fragmentary partially sectional view illustrating the shifter device in the interaxle differential.

At its front end, housing 14 is formed with a bore 18 in which is piloted the nose 19 of differential housing 15, and housings 14 and 15 are suitably removably bolted together in rigid assembly as at 21 in Figure 7.

Figure 4:
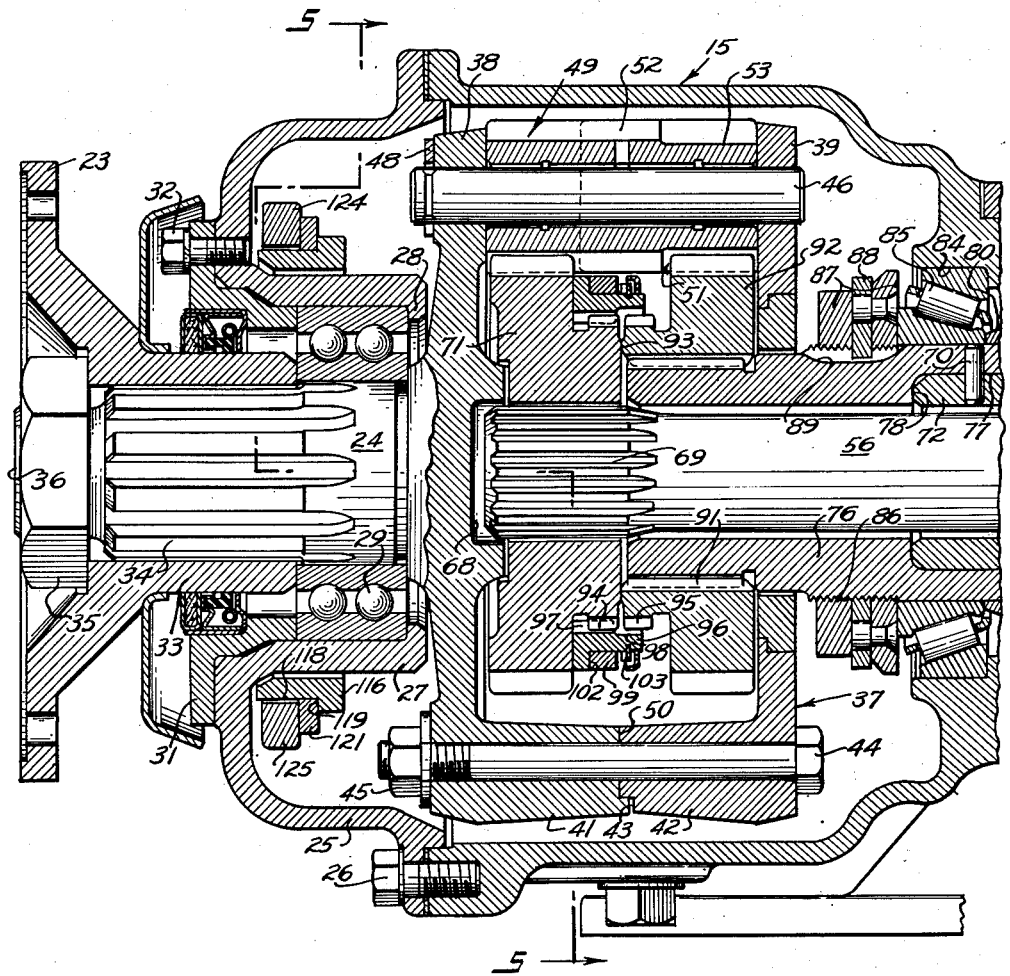
Figure 4 is a further enlarged section to illustrate the novel interaxle differential structure.

An engine driven propeller shaft 22 is attached by a universal joint and flanged coupling 23 to the front end of a short shaft 24 that projects forwardly out of housing 15. As illustrated in Figure 4, housing 15 has a removable front cover 25 secured thereto as by bolts 26. Cover 25 has a reentrant central portion forming a boss 27 provided with an inturned flange 28. A ball bearing assembly 29 has its outer race pressed within boss 27 and against flange 28, and its inner race is fixed with shaft 24 so that shaft 24 is journaled in housing 15. An annular retainer ring 31, secured to cover 25 as by bolts 32, abuts the outer race of bearing 29. The inner race of bearing 29 is abutted by the hub 33 of coupling 23 which is splined upon shaft 24 at 34 and secured thereto as by nut 35 and the threaded forward end 36 of shaft 24.

As illustrated in Figure 4, shaft 24 comprises an integral projection from a differential cage 37 in housing 15. Cage 37 comprises a forward tongue half 38 and a rear recess half 39 each of which is formed with a plurality of spaced integral projections 41 and 42 respectively extending toward each other and interfitted with peripheral shoulder and groove connections as illustrated at 43. Cage halves 38 and 39 are rigidly secured together as by six long bolts 44 extending through the matching projections and nuts 45. The mating abutting surfaces of the cage halves at 50 are flat and perpendicular to the axis of shaft 24 which is integral with cage half 38.

Referring to Figures 4 and 5, three pairs of adjacent pinion shafts 46 and 47 extend across the cage parallel to shaft 24, these shafts having one end pressed rigidly into cage 39 and the other end passing through cage 38 to be secured by a suitable retainer 48.

Three constantly meshed pairs of pinions 49 and 51 are freely rotatably mounted on the pairs of shafts 46 and 47 respectively. As illustrated in Figure 4, pinion 49 comprises a toothed section 52 and an axially shorter cylindrical section 53 of a diameter reduced below the root diameter of the toothed section. As illustrated in Figure 6, the pinion 51 is identical with pinion 49 but reversed end for end so that its toothed section 54 extends alongside the cylindrical section 53 of pinion 49 and its reduced diameter short cylindrical section 55 extends alongside the toothed section 52 of pinion 49. Intermediate the two cylindrical sections, the toothed sections of pinions 49 and 51 are constantly meshed.

A through drive shaft 56 extends through housing 14 in coaxial alignment with shaft 24. Shaft 56 is supported at its rear end in a ball bearing 57 that has its outer race mounted upon an annular cap 58 secured to housing 14 as by studs 59. The inner race of bearing 57 abuts a radial flange 61 on shaft 56, and a retainer ring 62 also clamped to the housing 14 by studs 59 abuts the outer race of bearing 57.

Outwardly of bearing 57, shaft 56 is formed with a splined section 63 on which is non-rotatably mounted a coupling member 64 as by nut 65 on the threaded reduced rear end 66 of shaft 56. The hub of coupling member 64, when nut 65 is drawn tight, abuts the inner race of bearing 57 to clamp it against shaft flange 61. A suitable lubricant seal 67 carried by ring 58 surrounds the hub of coupling member 64.

At its forward end, shaft 56 terminates within an internal recess 68 in cage half 38 but out of contact therewith. Within the cage, shaft 56 is splined at 69 and a front spur gear 71 having an internally splined bore is fixed thereon, gear 71 being secured against rotation or axial movement with respect to shaft 56. Gear 71 is constantly meshed with all of the pinions 49.

Referring again to Figure 3, shaft 56 is surrounded within housing 14 by a coaxial hollow quill shaft 72 that is spaced from shaft 72 and has its rear end mounted in a roller bearing 73. The outer race of bearing 73 is pressed within bore 74 in the rear wall of housing 14, and the inner race is secured against axial displacement on quill shaft 72 as by snap rings 75. Quill shaft 72 preferably terminates short of cap 58.

A hollow pinion shaft 76 is mounted coaxial with quill shaft 72 which projects within a cylindrical bore 77 and into abutment with a radial shoulder 78 within shaft 76. One or more radial pins 70 locate shafts 72 and 76 together and shafts 72 and 76 are permanently secured together as by brazing so that shaft 76 is in effect an integral extension of the quill shaft, both having the same inside diameter.

The nose 19 of differential housing 15 is formed with a shouldered end recess 79 within which is secured the outer race of a tapered roller bearing assembly 81 that has its inner race fixed on shaft 76 in abutment with a radial shoulder 82 formed on the back of a hypoid pinion gear 83 integral with shaft 76.

Forwardly of recess 79, housing 15 is formed with a shouldered recess 84 wherein is fixed the outer race of a tapered roller bearing assembly 85 that has its inner race fixed on shaft 76. Forwardly of bearing 85 shaft 76 has a threaded section 86 upon which is mounted a retainer ring 87 that abuts the inner race of bearing 85. When ring 87 is tightened the inner race of bearing 85 is urged against a spacer ring 80 which in turn is urged against the inner race of bearing 81 backed by shoulder 82. Ring 87 is provided with a locking key 88 that co-acts with a keyway 89 in shaft 76 to prevent the threaded ring from backing off its adjusted bearing loading position.

Within the differential cage 37, pinion shaft 76 terminates adjacent splined section 69 and rearwardly of gear 71, and is formed with an external splined end section 91 for receiving the internally splined hub of a rear spur gear 92 that is constantly meshed with pinions 51 within the cage. The adjacent side surfaces of gears 71 and 92 indicated at 93 are finished smooth flat and parallel so that if they contact there will be substantially no friction during relative rotation of the gears.

At their adjacent ends the hubs of gears 71 and 92 are formed with annular rows of clutch teeth 94 and 95 respectively that are thus disposed closely together. A clutch collar 96 formed with internal clutch teeth 97 is slidably mounted on clutch teeth 94, teeth 97 being removed at the rear of the collar to provide a recessed region 98 that clears clutch teeth 95 to permit relative rotation of gears 71 and 92 when the collar is in the position of Figure 4. When clutch collar 96 is shifted to the right in Figure 4, teeth 97 will bridge the rows of clutch teeth 94 and 95 and lock gears 71 and 92 for rotation together.

For shifting the clutch collar 96, I provide a shifter ring 99 (Figures 5 and 7) rotatably surrounding a reduced cylindrical portion 101 of collar 96 and held against axial movement on the collar by a radial shoulder 102 and a snap ring 103. Shifter ring 99 has a plurality of equally spaced radially outwardly extending arms 104 formed with apertures 105. A plurality of rods 106 parallel to pinion shafts 46 extend through apertures 105 and are slidably received in bores 107 and 108 respectively in cage halves 38 and 39. Rods 106 are rigid with shifter ring arms 104 which seat at one side against a radial shoulder 109 on the rod. A washer 111 coextensive with the other side of ring 99 is suitably secured thereto and is bent at its inner end to clamp over the snap ring 103. A coiled compression spring 112 surrounds each rod 106 between each arm 104 and cage half 39 and thereby normally urges ring 99 and collar 96 to the left in Figure 7. Thus Figure 7 represents the normal disengaged position of clutch collar 96.

Where each rod 106 projects through cage half 38, it is formed with a reduced threaded section 113 carrying a nut 114 for clamping the apertured radial ears 115 of an annular shifter yoke 116 against radial shoulder 117 of the rod. Referring to Figures 4 and 7, yoke 116 is disposed in the space surrounding reentrant boss 27 of the differential housing cover and has a reduced cylindrical end portion 118 and a forwardly facing radial shoulder 119. A flat sided washer 121 rotatably surrounding portion 118 is seated against shoulder 119.

A shifter fork 122 comprises a hub 123 and spaced arms 124 and 125 adapted to engage the side of washer 121 opposite shoulder 119. Fork hub 123 is fixed as by set screw 127 and locknut 128 to a rail 129 reciprocable in bores 131 and 132 formed in opposite side walls of a cap 133 closing a side aperture 134 in cover 25 of the differential housing. A plug 130 affords access to set screw 127 for adjustment. Rail 129 is reciprocated by a suitable control linkage (not shown) attached to ear 135, and it is normally urged to the left in Figure 7 by a coiled spring 136 compressed between fork hub 123 and cap 133. Thus normally spring 136 prevents fork 122 from pressing on the shifter yoke.

Pinion 83 is constantly meshed with a hypoid gear 137 that is fixed upon a cross shaft 138 journaled in housing 14 and carrying a gear 139 constantly meshed with ring gear 140 of a conventional axle differential assembly 141 disposed in housing 13. From axle differential 141, differentially driven drive axle shafts 142 extend to the opposite wheels as usual.

The axis of cross shaft 138 is disposed at right angles to and below the axis of shaft 56, and it is disposed parallel to and rearwardly of a vertical plane containing the axes of axle shafts 142. This general arrangement of parts is disclosed and claimed in my United States Letters Patent No. 2,480,836 issued September 6, 1949, the angle between a vertical plane passing through the axes of the axle shafts and a plane containing the axes of the axle shafts and the axis of cross shaft 138 being indicated at A in Figure 3.

Referring to Figure 1, coupling 64 is connected by universal joint 143 to a short propeller shaft 144 which in turn is connected by a universal joint 145 and coupling 146 to the left end 147 of a solid steel drive shaft 148 for the rearward axle of the tandem pair. Certain of the parts in the rear axle assembly 12 are identical with those of the forward axle assembly above described and these will be identified by the same numerals.

The rear end of shaft 148 is supported in bearing 73 in the same manner that the rear end of quill shaft 72 is supported in Figure 3. Shaft 148 terminates within bore 74 in this axle assembly and a cover plate 149 is secured over the bore as by studs 151.

Adjacent the front end of housing 14 of axle 12, a hypoid pinion 152 is secured upon shaft 148, pinion 152 having a cylindrical bore 153 surrounding a cylindrical section 154 of shaft 148. The right face of pinion 152 abuts a radial flange 155 on shaft 148 and the front end of the pinion hub 156 is internally splined. Shaft 148 has a splined section 157 upon which are mounted in abutment the hub of coupling 146 and the pinion hub 156, so that when nut 158 is drawn tight the pinion is axially clamped on shaft 148. Pinion 152 constantly meshes with hypoid gear 160 which corresponds to gear 137 of Figure 3. The gear reduction and differential drive in axle 12 is otherwise the same as in Figure 3.

The back of gear 152 has a flat radial shoulder 159 for abutting the inner race of bearing 81 which in this axle is mounted in a shouldered end recess 161 of a carrier ring 162 bolted or similarly secured to housing 14. Bearing 85 is seated in shouldered recess 163 in the other end of ring 162 and its inner race is fixed upon a cylindrical section of pinion hub 156. The retainer ring and locking key assembly 87, 88 is mounted on the threaded end section of pinion hub 145. A sheet metal closure cap 165 containing a seal ring 166 extends over the locking retainer for the pinion.

In operation, with the parts positioned as shown in the drawings, shaft 22 is constantly driven from the vehicle transmission, thereby constantly rotating cage 37 about its axis. Since pinions 49 and 51 are constantly meshed with gears 71 and 92 respectively, power is transmitted separately through those gears to the individual tandem axles. As cage 37 rotates, freely journaled pinions 49 and 51 may tend to be rotated in the same direction by the resistance of the axle mechanism but since pinions 49 and 51 are always meshed they lock each other against rotation and they drive like a differential gear under normal roadway traction conditions, one-half of the power being supplied to each tandem axle.

Power is transmitted through gear 71, shaft 56, coupling 143, shaft 144, coupling 145, shaft 148 and hypoid gearing 152, 160 to the rearward axle mechanism. Power is transmitted through gear 92, shafts 76 and 72 and hypoid gearing 83, 137 to the forward axle mechanism. Under normal roadway traction conditions gears 71 and 92 rotate at the same speed.

Since pinions 49 and 51 are freely journaled on their shafts and in constant mesh, this equal division of power between the axles may vary by differential action whereby the respective axle mechanisms are differentially driven from the engine driven propeller shaft. For example, should axle assembly 11 lose traction at one or both wheels, gear 92 and the axle mechanism offer less resistance to the drive and hence gear 92 may rotate faster than gear 71 with consequent relative rotation of pinions 49 and 51.

When sand, snow and like poor traction conditions are encountered, the differential mechanism in housing 15 may be locked out by shifting clutch collar 96 to bridge clutch teeth 94 and 95. This locks gears 71 and 92 for rotation together to impart a positive non-differential drive from the propeller shaft to each axle assembly 11 and 12.

When rail 129 is shifted to the right in Figure 7, fork 122 engages washer 121 to shift yoke 116 and rods 106 in the same direction against the opposition of springs 112 and 136. Abutment of shoulder 109 carries ring 99 along rods 106 and since ring 99 is axially fixed with respect to collar 96, the collar 96 is shifted toward gear 92 until it meshes with teeth 95. This movement of collar 96 may be limited in extent by controlling the distance between yoke 116 and cage half 38, or by any suitable stop means.

Apart from the novel differential drive arrangements above pointed out in detail, the invention has many advantages not available in prior tandem axle assemblies. The entire interaxle differential drive assembly of housing 15 is removable and it may be provided as an accessory at the option of the purchaser. In case the interaxle differential is not desired the shaft and drive gear arrangements of axle 12 will be employed in forward axle 11. Standard axle parts are employed in both axles, and no variation except installation of housing 15 and shafts 56 and 72 is necessary to convert a standard tandem axle assembly to one having an interaxle differential with a lockout. While the invention is disclosed as applied to one type of axle it may be applied to two speed axles, single reduction axles and others.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In drive axle mechanism, a rotatably mounted differential cage, independently rotatable coaxial axle drive shafts having adjacent ends disposed within said cage, gears fixed on said shaft ends disposed within the cage in side by side relation, clutch means shiftable for permitting independent rotation of said gears or for coupling said gears together, said clutch means comprising adjacent rows of teeth on the respective gears and a slidable toothed collar, means for shifting said collar, and a plurality of pairs of meshed pinions idly rotatably mounted on said cage, one pinion of each pair being constantly meshed with only one of said gears and the other pinion of each pair being constantly meshed with only the other of said gears.

2. In an axle drive mechanism, a rotatably mounted differential cage, coaxial independently rotatable axle drive shafts having adjacent ends within said cage, gears disposed in side by side relation fixed on the respective shaft ends, sets of pinions on the cage constantly meshed with the respective gears, rows of clutch teeth on the adjacent sides of said gears, a clutch collar slidable to permit independent rotation of said gears or to bridge said rows of clutch teeth to couple said gears for rotation together, and means for shifting said collar comprising a shifter ring surrounding and substantially axially fixed with respect to said collar, a yoke mounted for reciprocation axially of said cage and having means projecting into said cage into operative connection with said shifter ring, and a reciprocable fork for actuating said yoke.

3. In an axle drive mechanism, two coaxial axle drive shafts, a rotatable differential cage surrounding said shafts at one end, gears fixed on said shafts in side by side relation and within the cage and operably drive connected to said cage, means for clutching or declutching said gears comprising clutch teeth on the adjacent sides of said gears and a coacting clutch collar disposed between the gears, a shifter ring surrounding said collar and axially fixed with respect to said collar, arms on said shifter ring projecting radially toward the periphery of said cage, a yoke having axially projecting rods slidably mounted on said cage operatively connected to said shifter ring arms, and a reciprocable fork for actuating said yoke.

4. In the mechanism defined in claim 3, the operative connection between each rod and the shifter ring comprising an abutment on each rod adapted to contact one side of each arm, and a compression spring between the other side of each arm and the cage.

5. In a vehicle tandem axle drive assembly having spaced transverse axles each having transverse wheel connected axle shafts interconnected by differential gearing, transverse cross shafts in said axles located above and substantially parallel to said axle shafts, an interaxle differential mounted on the foremost of said drive axles and having two differentially driven side gears disposed side by side, coaxial output shafts that extend from the respective gears longitudinally rearwardly of said vehicle above said axle shafts, the common axis of said output shafts being disposed at a higher level than said cross shaft axes, a set of hypoid reduction gearing between each said output shaft and the associated cross shaft, a set of reduction gearing between each cross shaft and the associated axle differential, and means in said interaxle differential for optionally locking said output shafts together comprising a clutch collar disposed between said output gears and slidably mounted on one of them.

6. In a vehicle tandem axle drive assembly having spaced transverse axles, the foremost of said axles comprising a housing containing an axle shaft connected differential rotatably mounted on a transverse axis, a transverse cross shaft rotatably mounted in said housing above said differential, reduction gearing between said cross shaft and differential, a hollow drive shaft journaled at opposite ends in said housing on an axis substantially normal to said cross shaft axis, reduction gearing on said hollow shaft and cross shaft, a drive shaft extending through said hollow shaft and adapted to be connected to the rearmost of said axles, a differential casing mounted on said housing, spur gear differential mechanism in said casing comprising differentially driven side gears fixed upon said hollow shaft and said rearmost axle drive shaft respectively, and clutch means in said casing for optionally locking said side gears for rotation together.

7. In an axle drive mechanism, coaxial telescoped axle drive shafts adapted to be drive connected to separate axle assemblies, and means for differentially drive connecting said shafts comprising spur gears of the same size fixed on adjacent ends of said shafts and in side by side relation, a power input shaft, a cage fixed to said input shaft, two sets of spur pinions rotatably mounted on said cage surrounding said gears, each set of pinions being meshed with a different one of said spur gears on the axle drive shafts, and a gear of each pinion set being constantly meshed with a gear of the other set, and means for clutching or declutching said gears on the axle drive shafts for rotation together or independently comprising a clutch element disposed in the space between said spur gears slidably and non-rotatably mounted on one of said spur gears and coacting clutch teeth on said element and the other of said spur gears.

8. In drive axle mechanism, a rotatably mounted differential cage, independently rotatable coaxial axle drive shafts having adjacent ends disposed within said cage, one of said shafts being hollow and the other extending therethrough, gears fixed on the shaft ends disposed within the cage in side by side relation, a set of clutch teeth on one of said gears, a clutch collar slidably and non-rotatably mounted on the other of said gears and having a set of clutch teeth adapted to mesh with said set of clutch teeth on said one gear, means for shifting said clutch collar between one position wherein said clutch teeth are not meshed for permitting independent rotation of said gears and another position wherein said clutch teeth are meshed to lock said gears together, and a plurality of pairs of meshed pinions idly rotatably mounted on said cage and arranged in a row surrounding said gears, one pinion of each pair being constantly meshed with only one of said gears and the other pinion of each pair being constantly meshed with only the other of said gears.

References Cited in the file of this patent

UNITED STATES PATENTS

| Number | Name | Date |
|---|---|---|
| 1,033,511 | Zimmerman | July 23, 1912 |
| 1,108,800 | Shrader | Aug. 25, 1914 |
| 1,402,301 | Leipert | Jan. 3, 1922 |
| 1,492,380 | Leipert | Apr. 29, 1924 |
| 1,690,189 | Dennison | Nov. 6, 1928 |
| 1,711,128 | Robbins | Apr. 30, 1929 |
| 1,736,836 | Rayburn | Nov. 26, 1929 |
| 1,835,412 | Livingood | Dec. 8, 1931 |
| 1,938,848 | Mathews | Dec. 12, 1933 |
| 2,033,246 | Keese | Mar. 10, 1936 |
| 2,166,099 | Quartullo | July 11, 1939 |
| 2,228,581 | Olen | Jan. 14, 1941 |

FOREIGN PATENTS

| Number | Country | Date |
|---|---|---|
| 314,349 | Germany | Sept. 16, 1919 |
| 429,304 | Germany | May 21, 1926 |
| 14,228 | Great Britain | June 18, 1912 |